US012559249B2

(12) United States Patent
Strutt

(10) Patent No.: US 12,559,249 B2
(45) Date of Patent: Feb. 24, 2026

(54) ENGINE EXHAUST CENTER BODY WITH ACOUSTIC ATTENUATION

(71) Applicant: Rohr, Inc., Chula Vista, CA (US)

(72) Inventor: Andrew J. Strutt, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 242 days.

(21) Appl. No.: 18/403,310

(22) Filed: Jan. 3, 2024

(65) Prior Publication Data

US 2024/0217668 A1     Jul. 4, 2024

Related U.S. Application Data

(60) Provisional application No. 63/436,795, filed on Jan. 3, 2023.

(51) Int. Cl.
  *B64D 33/04*     (2006.01)
  *F01D 25/30*     (2006.01)
(52) U.S. Cl.
  CPC .............. *B64D 33/06* (2013.01); *F01D 25/30* (2013.01)
(58) Field of Classification Search
  CPC . F02C 7/24; F01D 25/30; B64D 33/06; F02K 1/827
  See application file for complete search history.

(56) References Cited

U.S. PATENT DOCUMENTS

| | | | | |
|---|---|---|---|---|
| 2,988,302 A | * | 6/1961 | Smith | ........................ F02K 1/36 |
| | | | | 244/209 |
| 4,106,587 A | * | 8/1978 | Nash | ........................ F02K 1/827 |
| | | | | 181/290 |
| 6,935,834 B2 | | 8/2005 | Lata Perez | |
| 7,784,283 B2 | | 8/2010 | Yu | |
| 8,037,967 B2 | * | 10/2011 | Mercat | .................... F02K 1/827 |
| | | | | 244/1 N |
| 8,479,877 B2 | | 7/2013 | Todorovic | |
| 9,261,008 B2 | | 2/2016 | Mecuson | |
| 11,136,942 B2 | | 10/2021 | Lopez | |

(Continued)

FOREIGN PATENT DOCUMENTS

| | | | | |
|---|---|---|---|---|
| FR | | 3111949 A1 * | 12/2021 | ............. F02K 1/827 |
| FR | | 3114847 A1 * | 4/2022 | ............. F02K 1/827 |

(Continued)

OTHER PUBLICATIONS

EP search report for EP24150210.3 dated Jun. 4, 2024.

*Primary Examiner* — Jeremy A Luks
(74) *Attorney, Agent, or Firm* — Getz Balich LLC

(57)     ABSTRACT

An exhaust center body includes an inner skin, a perforated outer skin, a first bulkhead, a second bulkhead, a baffle and an acoustic chamber. The first bulkhead extends radially between the inner skin and the perforated outer skin. The second bulkhead extends radially between the inner skin and the perforated outer skin. The baffle includes a panel and a flange formed integral with the panel. The panel extends radially between the inner skin and the perforated outer skin. The panel extends axially along the axial centerline between the first bulkhead and the second bulkhead. The panel is attached to one of the inner skin, the first bulkhead or the second bulkhead by the flange. The acoustic chamber is formed radially between the inner skin and the perforated outer skin, axially between the first bulkhead and the second bulkhead, and circumferentially adjacent the baffle.

19 Claims, 12 Drawing Sheets

(56)     References Cited

U.S. PATENT DOCUMENTS

| | | | |
|---|---|---|---|
| 11,428,191 B1* | 8/2022 | Alonso-Miralles | F02K 1/80 |
| 2012/0160933 A1* | 6/2012 | Vauchel | F02K 1/827 |
| | | | 239/265.11 |
| 2019/0162079 A1 | 5/2019 | Bertandeau | |
| 2020/0088135 A1 | 3/2020 | Lopez | |
| 2020/0232344 A1* | 7/2020 | Ferreira | F01D 25/30 |
| 2021/0215122 A1* | 7/2021 | Brochard | G10K 11/161 |
| 2021/0262364 A1 | 8/2021 | Andre | |
| 2021/0310411 A1* | 10/2021 | Kelford | F02K 1/04 |
| 2022/0034260 A1 | 2/2022 | Porte | |
| 2024/0077046 A1* | 3/2024 | Gaul | F02K 1/827 |

FOREIGN PATENT DOCUMENTS

| | | | | | |
|---|---|---|---|---|---|
| FR | 3114848 A1 * | 4/2022 | | F02K 1/827 |
| FR | 3116306 A1 * | 5/2022 | | F02K 1/827 |
| FR | 3117151 A1 * | 6/2022 | | F02K 1/04 |
| WO | 2022117968 A1 | 6/2022 | | |

* cited by examiner

ENGINE EXHAUST CENTER BODY WITH ACOUSTIC ATTENUATION

This application claims priority to U.S. patent application Ser. No. 63/436,795 filed Jan. 3, 2023, which is hereby incorporated herein by reference in its entirety.

GOVERNMENT LICENSE RIGHTS

This invention was made with government support under Contract No. 693KA9-21-T-00002 awarded by the United States Federal Aviation Administration. The government may have certain rights in the invention.

BACKGROUND

1. Technical Field

This disclosure relates generally to an aircraft propulsion system and, more particularly, to sound attenuation for the aircraft propulsion system.

2. Background Information

An aircraft propulsion system directs combustion products through an exhaust outlet between an exhaust nozzle and an exhaust center body. Sound waves (e.g., noise) generated during propulsion system operation may travel with the combustion products out through the exhaust outlet. Some exhaust center bodies are configured with structures for attenuating these sound waves. While known sound attenuating structures have various advantages, there is still room in the art for improvement. In particular, there is a need in the art for sound attenuation structures capable of attenuating low frequency sound waves while maintaining structural integrity.

SUMMARY OF THE DISCLOSURE

According to an aspect of the present disclosure, an assembly is provided for an aircraft propulsion system. This assembly includes an exhaust center body. The exhaust center body includes an inner skin, a perforated outer skin, a first bulkhead, a second bulkhead, a baffle and an acoustic chamber. The first bulkhead extends radially between and is attached to the inner skin and the perforated outer skin. The first bulkhead extends circumferentially about an axial centerline. The second bulkhead extends radially between and is attached to the inner skin and the perforated outer skin. The second bulkhead extends circumferentially about the axial centerline. The baffle includes a panel and a flange formed integral with the panel. The panel extends radially between the inner skin and the perforated outer skin. The panel extends axially along the axial centerline between the first bulkhead and the second bulkhead. The panel is attached to one of the inner skin, the first bulkhead or the second bulkhead by the flange. The acoustic chamber is formed within the exhaust center body radially between the inner skin and the perforated outer skin, axially between the first bulkhead and the second bulkhead, and circumferentially adjacent the baffle.

According to another aspect of the present disclosure, an assembly is provided for a gas turbine engine. This assembly includes an exhaust center body. The exhaust center body includes an inner skin, a perforated outer skin, a first bulkhead, a second bulkhead, a baffle and an acoustic chamber. The first bulkhead extends radially between and is attached to the inner skin and the perforated outer skin. The first bulkhead extends circumferentially about an axial centerline of the exhaust center body. The second bulkhead extends radially between and is attached to the inner skin and the perforated outer skin. The second bulkhead extends circumferentially about the axial centerline of the exhaust center body. The baffle extends radially between the inner skin and the perforated outer skin. The baffle extends axially along the axial centerline between the first bulkhead and the second bulkhead. The baffle is attached to the inner skin, the first bulkhead and the second bulkhead. The baffle includes a structural panel with a cellular core. The acoustic chamber is formed within the exhaust center body radially between the inner skin and the perforated outer skin, axially between the first bulkhead and the second bulkhead, and circumferentially adjacent the baffle.

According to still another aspect of the present disclosure, another assembly is provided for a gas turbine engine. This assembly includes an exhaust center body. The exhaust center body includes an inner skin, a perforated outer skin, a first bulkhead, a second bulkhead, a baffle and an acoustic chamber. The first bulkhead extends radially between and is attached to the inner skin and the perforated outer skin. The first bulkhead extends circumferentially about an axial centerline of the exhaust center body. The first bulkhead includes a structural panel with a cellular core. The second bulkhead extends radially between and is attached to the inner skin and the perforated outer skin. The second bulkhead extends circumferentially about the axial centerline of the exhaust center body. The baffle extends radially and axially across the acoustic chamber. The baffle is attached to the inner skin, the first bulkhead and the second bulkhead. The acoustic chamber is formed within the exhaust center body radially between the inner skin and the perforated outer skin, axially between the first bulkhead and the second bulkhead, and circumferentially adjacent the baffle.

The baffle may include a panel and a flange formed integral with the panel. The panel may extend radially and axially across the acoustic chamber. The flange may be attached to one of the inner skin, the first bulkhead or the second bulkhead.

The flange may be attached to the inner skin.

The flange may be attached to the inner skin with one or more mechanical fasteners.

The flange may extend along at least eighty percent of an axial length of the panel.

The flange may be attached to the first bulkhead.

The flange may be attached to the first bulkhead with one or more mechanical fasteners.

The flange may extend along at least forty percent of a radial height of the panel.

The flange may be a first flange. The baffle may also include a second flange formed integral with the panel. The second flange may be attached to the first bulkhead and may be radially adjacent the first flange.

The flange may be a first bulkhead flange. The baffle may also include a second bulkhead flange formed integral with the panel. The second bulkhead flange may be attached to the second bulkhead.

The baffle may also include an inner skin flange formed integral with the panel. The inner skin flange may be attached to the inner skin.

The baffle may also include a baffle skin and a cellular core connected to and extending between the panel and the baffle skin.

The cellular core may be configured as or otherwise include a honeycomb core.

The first bulkhead may include a first bulkhead structural panel. The first bulkhead structural panel may include a first bulkhead panel, a first bulkhead skin and a first bulkhead cellular core connected to and extending between the first bulkhead panel and the first bulkhead skin.

The second bulkhead may include a second bulkhead structural panel. The second bulkhead structural panel may include a second bulkhead panel, a second bulkhead skin and a second bulkhead cellular core connected to and extending between the second bulkhead panel and the second bulkhead skin.

The first bulkhead may include a flex feature configured to accommodate shifting between the inner skin and the perforated outer skin.

The flex feature may include a bead formed into a panel of the first bulkhead.

The bead may extend circumferentially about the axial centerline.

The flex feature may include a portion of a panel of the first bulkhead with a smaller thickness than a radially adjacent portion of the panel.

The assembly may also include an exhaust nozzle radially outboard of and extending circumferentially about the exhaust center body.

The perforated outer skin may form a portion of an inner peripheral boundary of a core flowpath of the aircraft propulsion system.

The assembly may also include an engine core. The engine core may include a compressor section, a combustor section and a turbine section. The core flowpath may extend sequentially through the compressor section, the combustor section and the turbine section to the exhaust center body.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
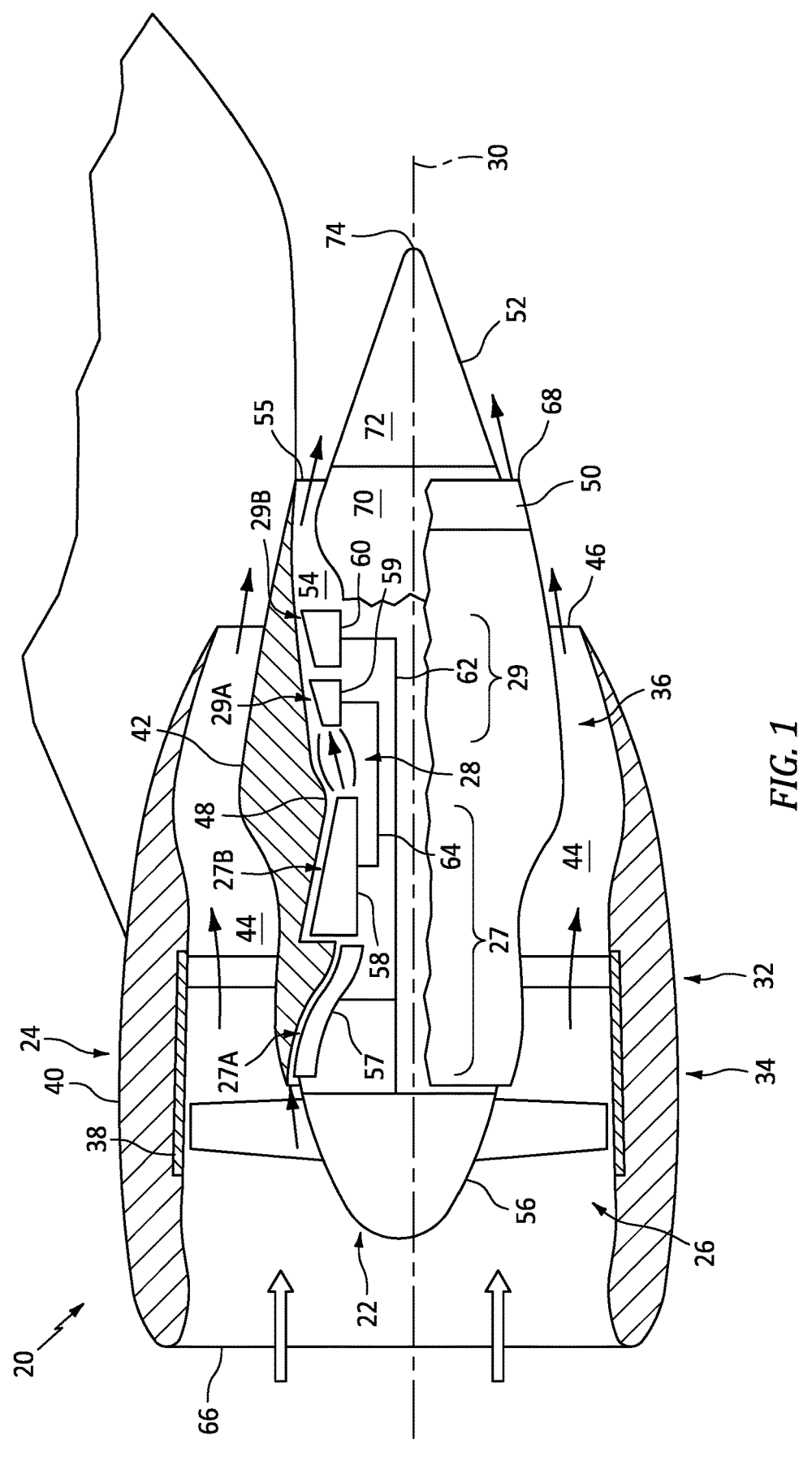
FIG. 1 is a side cutaway schematic illustration of an aircraft propulsion system.

FIG. 1 illustrates an aircraft propulsion system 20 for an aircraft such as, but not limited to, a commercial airliner or cargo plane. The aircraft propulsion system 20 includes a gas turbine engine 22 and a nacelle 24.

The gas turbine engine 22 may be configured as a high-bypass turbofan engine. The gas turbine engine 22 of FIG. 1, for example, includes a fan section 26, a compressor section 27, a combustor section 28 and a turbine section 29. The compressor section 27 may include a low pressure compressor (LPC) section 27A and a high pressure compressor (HPC) section 27B. The turbine section 29 may include a high pressure turbine (HPT) section 29A and a low pressure turbine (LPT) section 29B.

The engine sections 26-29B are arranged sequentially along an axial centerline 30 (e.g., a rotational axis) of the gas turbine engine 22 within an aircraft propulsion system housing 32. This housing 32 includes an outer housing structure 34 and an inner housing structure 36.

The outer housing structure 34 includes an outer case 38 (e.g., a fan case, a containment case, etc.) and an outer structure 40 of the nacelle 24; i.e., an outer nacelle structure. The outer case 38 houses at least the fan section 26. The outer nacelle structure 40 houses and provides an aerodynamic cover over the outer case 38. The outer nacelle structure 40 also covers a portion of an inner structure 42 of the nacelle 24; e.g., an inner nacelle structure, which may also be referred to as an inner fixed structure. More particularly, the outer nacelle structure 40 axially overlaps and extends circumferentially about (e.g., completely around) the inner nacelle structure 42. The outer nacelle structure 40 and the inner nacelle structure 42 thereby at least partially or completely form a bypass flowpath 44. This bypass flowpath 44 extends axially along the axial centerline 30 within the aircraft propulsion system 20 to a bypass exhaust 46, where the bypass flowpath 44 is radially between the nacelle structures 34 and 36.

The inner housing structure 36 includes an inner case 48 (e.g., a core case) and the inner nacelle structure 42. The inner case 48 houses one or more of the engine sections 27A-29B, where at least (or only) the engine sections 27A-29B may collectively form a core of the gas turbine engine 22. The inner nacelle structure 42 houses and provides an aerodynamic cover for the inner case 48. A downstream/aft portion of the inner housing structure 36 such as, for example, a (e.g., tubular) core exhaust nozzle 50 of the inner nacelle structure 42 also covers at least a portion of an (e.g., conical) exhaust center body 52. More particularly, the inner nacelle structure 42 and its exhaust nozzle 50 axially overlap and extend circumferentially about (e.g., completely around) the exhaust center body 52. The exhaust nozzle 50 and the exhaust center body 52 thereby collectively form a downstream/aft portion of a core flowpath 54; e.g., an annular flowpath. This core flowpath 54 extends axially within the aircraft propulsion system 20, sequentially through the engine sections 27A-29B (e.g., the engine core), to a core exhaust 55 at a downstream/aft end of the aircraft propulsion system 20.

Each of the engine sections 26, 27A, 27B, 29A and 29B of FIG. 1 includes a respective bladed rotor 56-60. Each of these engine rotors 56-60 includes a plurality of rotor blades arranged circumferentially around and connected to one or more respective rotor disks.

The fan rotor 56 and the LPC rotor 57 are connected to and driven by the LPT rotor 60 through a low speed shaft 62. The HPC rotor 58 is connected to and driven by the HPT rotor 59 through a high speed shaft 64. The engine shafts 62 and 64 are rotatably supported by a plurality of bearings (not shown). Each of these bearings is connected to the aircraft propulsion system housing 32 by at least one stationary structure such as, for example, an annular support strut.

During operation, air enters the aircraft propulsion system 20 through an airflow inlet 66. This air is directed through the fan section 26 and into the core flowpath 54 and the bypass flowpath 44. The air entering the core flowpath 54 may be referred to as core air. The air within the bypass flowpath 44 may be referred to as bypass air.

The core air is compressed by the compressor rotors 57 and 58 and directed into a combustion chamber of a combustor in the combustor section 28. Fuel is injected into the combustion chamber and mixed with the compressed core air to provide a fuel-air mixture. This fuel air mixture is ignited and combustion products thereof flow through and sequentially cause the turbine rotors 59 and 60 to rotate. The rotation of the turbine rotors 59 and 60 respectively drive rotation of the compressor rotors 58 and 57 and, thus, compression of the air received from a core airflow inlet. The rotation of the turbine rotor 60 also drives rotation of the fan rotor 56, which propels bypass air through and out of the bypass flowpath 44. The propulsion of the bypass air may account for a majority of thrust generated by the gas turbine engine 22. The aircraft propulsion system 20 of the present disclosure, however, is not limited to the exemplary gas turbine engine configuration described above as discussed below in further detail.

The core exhaust nozzle 50 of FIG. 1 is connected to a component of the inner housing structure 36 such as a turbine exhaust case (TEC). The core exhaust nozzle 50 projects axially out from the turbine exhaust case to a trailing edge 68 of the core exhaust nozzle 50. The core exhaust nozzle 50 thereby axially overlaps at least an upstream, forward section 70 of the exhaust center body 52; e.g., an acoustic forward center body assembly. The core exhaust nozzle 50 also extends circumferentially about (e.g., completely around) the axial centerline 30, thereby circumscribing the exhaust center body 52 and its center body section 70.

The exhaust center body 52 of FIG. 1 includes the center body section 70 and a downstream, aft exhaust tail cone section 72. The exhaust center body 52 and its center body section 70 are connected to a component of the housing structure 36 such as the turbine exhaust case. The center body section 70 projects axially out from the turbine exhaust case to the tail cone section 72. The tail cone section 72 is connected to the center body section 70, and projects axially to a downstream, aft tip 74 of the exhaust center body 52 and its tail cone section 72. The tail cone section 72 of FIG. 1 is axially downstream, aft of the exhaust nozzle trailing edge 68; however, the present disclosure is not limited to such an exemplary arrangement.

Figure 2:
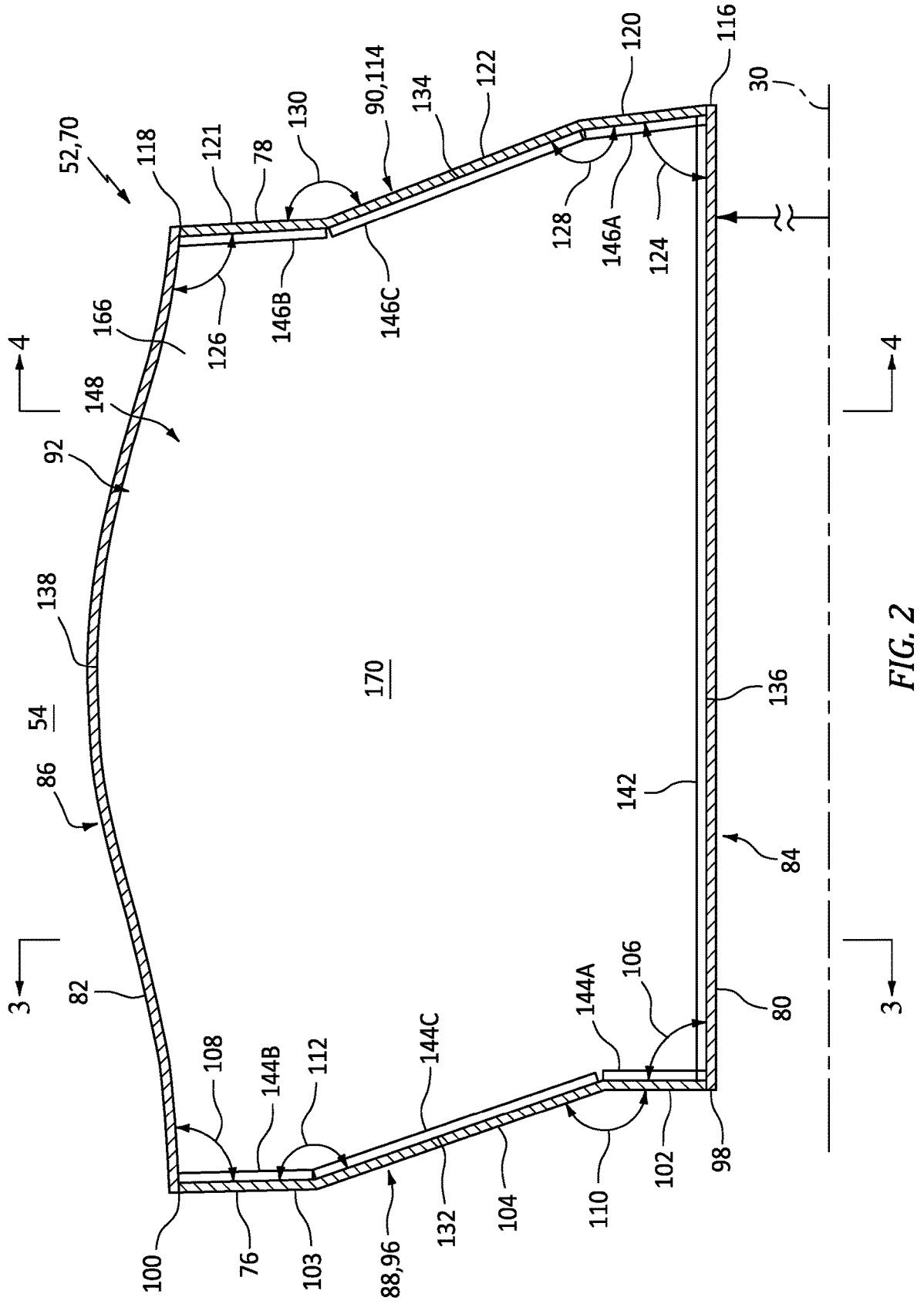
FIG. 2 is a partial side sectional illustration of a section of an exhaust center body.
Figure 3:
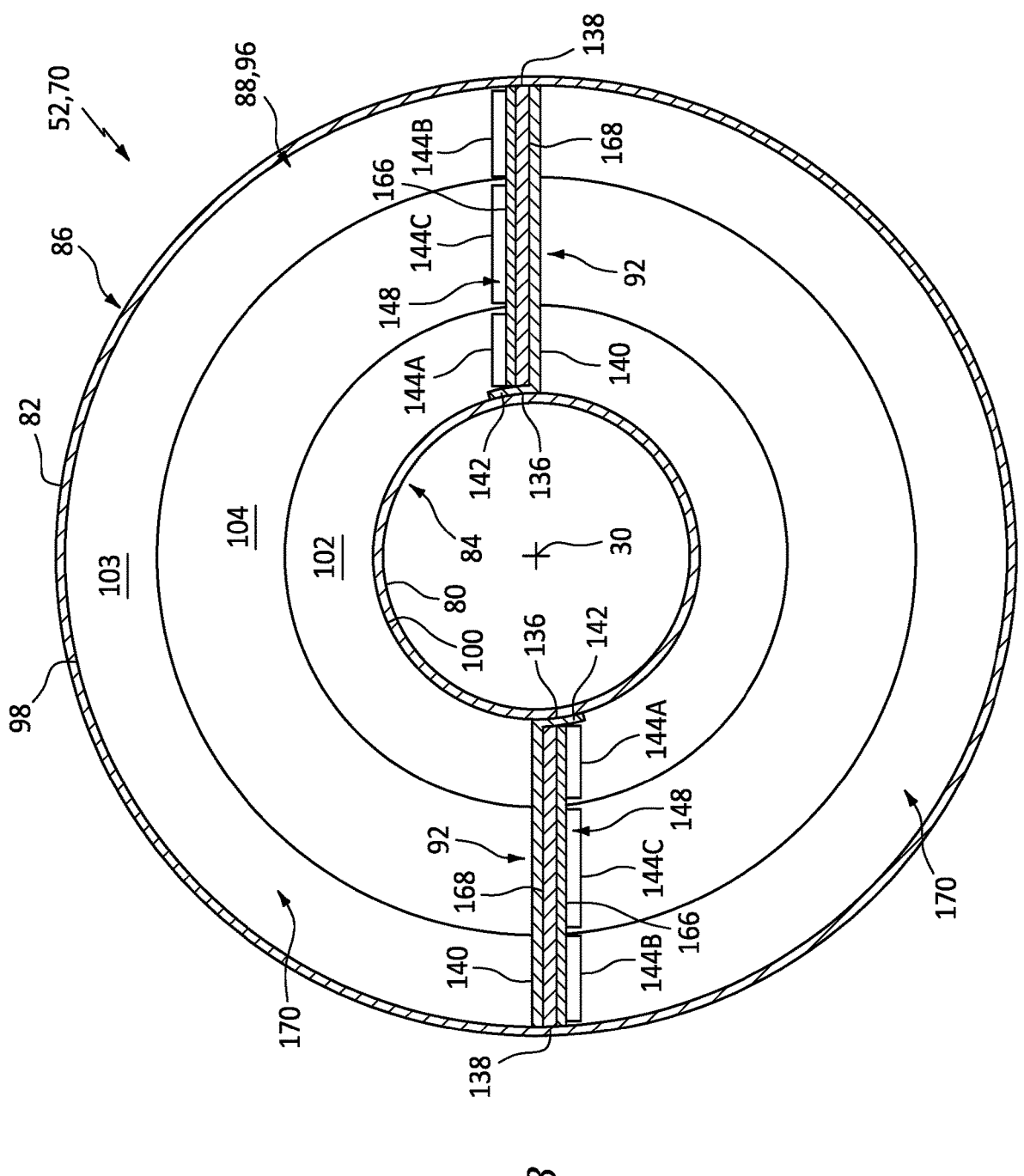
FIG. 3 is a cross-sectional illustration of the center body section taken along line 3-3 in FIG. 2.
Figure 4:
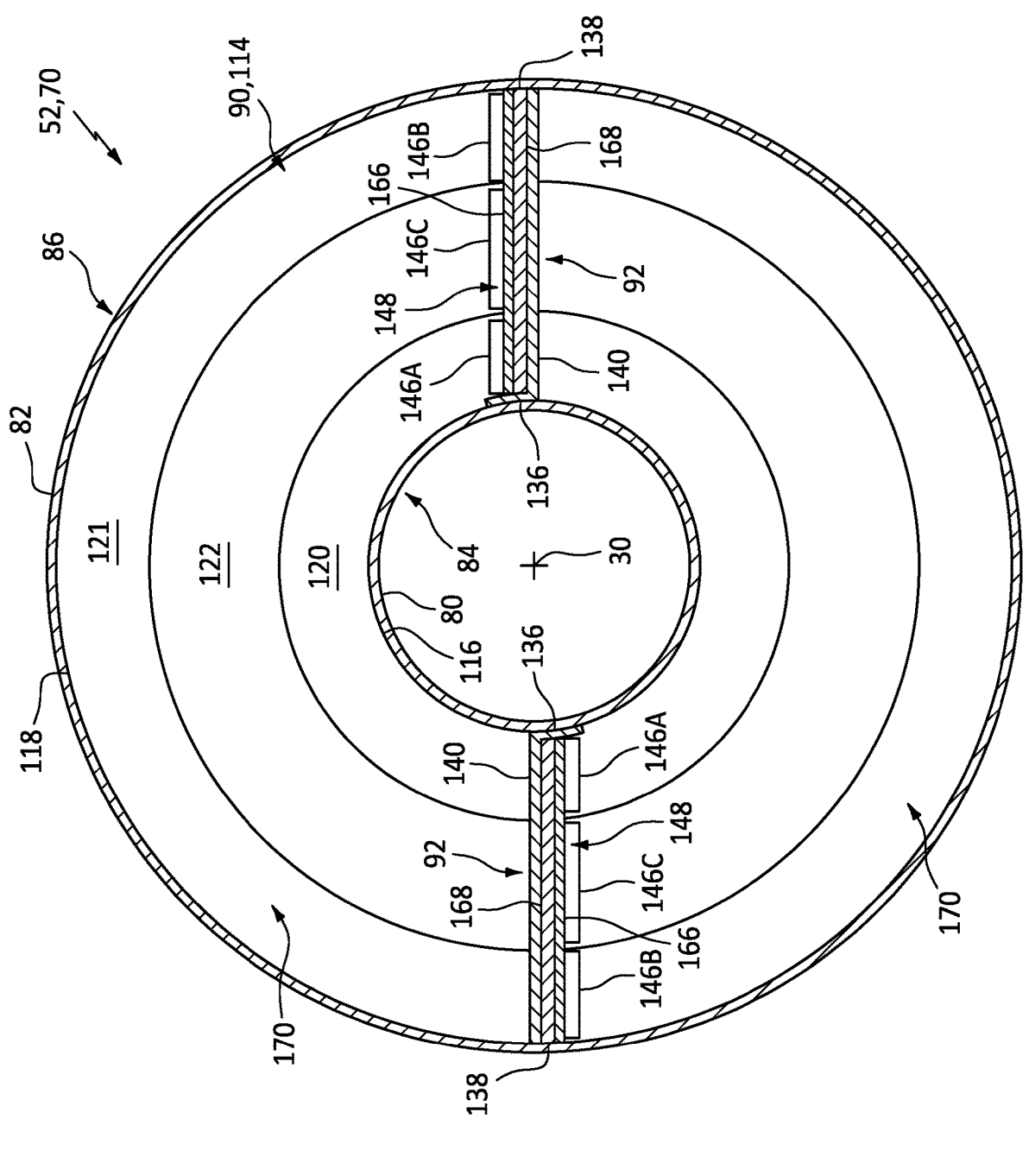
FIG. 4 is a cross-sectional illustration of the center body section taken along line 4-4 in FIG. 2.

Referring to FIG. 2, the center body section 70 extends axially along the axial centerline 30 from an upstream, forward end 76 of the exhaust center body 52 and its center body section 70 to a downstream, aft end 78 of the center body section 70. The center body section 70 extends radially (in a direction away from the axial centerline 30) from an inner side 80 of the exhaust center body 52 and its center body section 70 to an outer side 82 of the exhaust center body 52 and its center body section 70. Referring to FIGS. 3 and 4, the exhaust center body 52 and its center body section 70 extend circumferentially about (e.g., completely around) the axial centerline 30. The center body section 70 may thereby have a full-hoop tubular geometry. Referring to FIGS. 2, 3 and 4, the exhaust center body 52 and its center body section 70 include an inner skin 84, a perforated outer skin 86, an upstream, forward bulkhead 88, a downstream, aft bulkhead 90 and one or more baffles 92.

The inner skin 84 may be configured as a relatively thin sheet or layer of continuous and uninterrupted material; e.g., non-perforated material. The inner skin 84 of FIG. 2 extends axially along the axial centerline 30 from or about the body section forward end 76 to or about the body section aft end 78. The inner skin 84 extends radially between radially opposing surfaces of the inner skin 84. Referring to FIGS. 3 and 4, the inner skin 84 extends circumferentially about (e.g., completely around) the axial centerline 30. The inner skin 84 may thereby have a full-hoop tubular geometry. The inner skin 84 and each of its surfaces may be cylindrical.

The outer skin 86 may be configured as a relatively thin sheet or layer of material with one or more perforations 94 (see FIG. 5); e.g., apertures such as through holes. The outer skin 86 of FIG. 2 extends axially along the axial centerline 30 from or about the body section forward end 76 to or about the body section aft end 78. In the specific embodiment of FIG. 2, a forward end of the outer skin 86 projects (e.g., slightly) axially away/out from a forward end of the inner skin 84, and an aft end of the inner skin 84 projects (e.g., slightly) axially away/out from an aft end of the outer skin 86. The present disclosure, however, is not limited to such an exemplary arrangement. For example, in other embodiments, the forward ends and/or the aft ends of the inner and the outer skins 84 and 86 may be axially aligned or otherwise arranged. The outer skin 86 of FIG. 2 extends radially between radially opposing surfaces of the outer skin 86. Referring to FIGS. 3 and 4, the outer skin 86 extends circumferentially about (e.g., completely around) the axial centerline 30. The outer skin 86 may thereby have a full-hoop tubular geometry. The outer skin 86 and each of its surfaces may have a circular cross-sectional geometry when viewed, for example, in a first reference plane perpendicular to the axial centerline 30. However, referring to FIG. 2, the outer skin 86 and each of its surfaces may have a curved (e.g., undulating, splined, arcuate, etc.) sectional geometry when viewed, for example, in a second reference plane parallel with (e.g., including) the axial centerline 30.

Figures 5, 6:
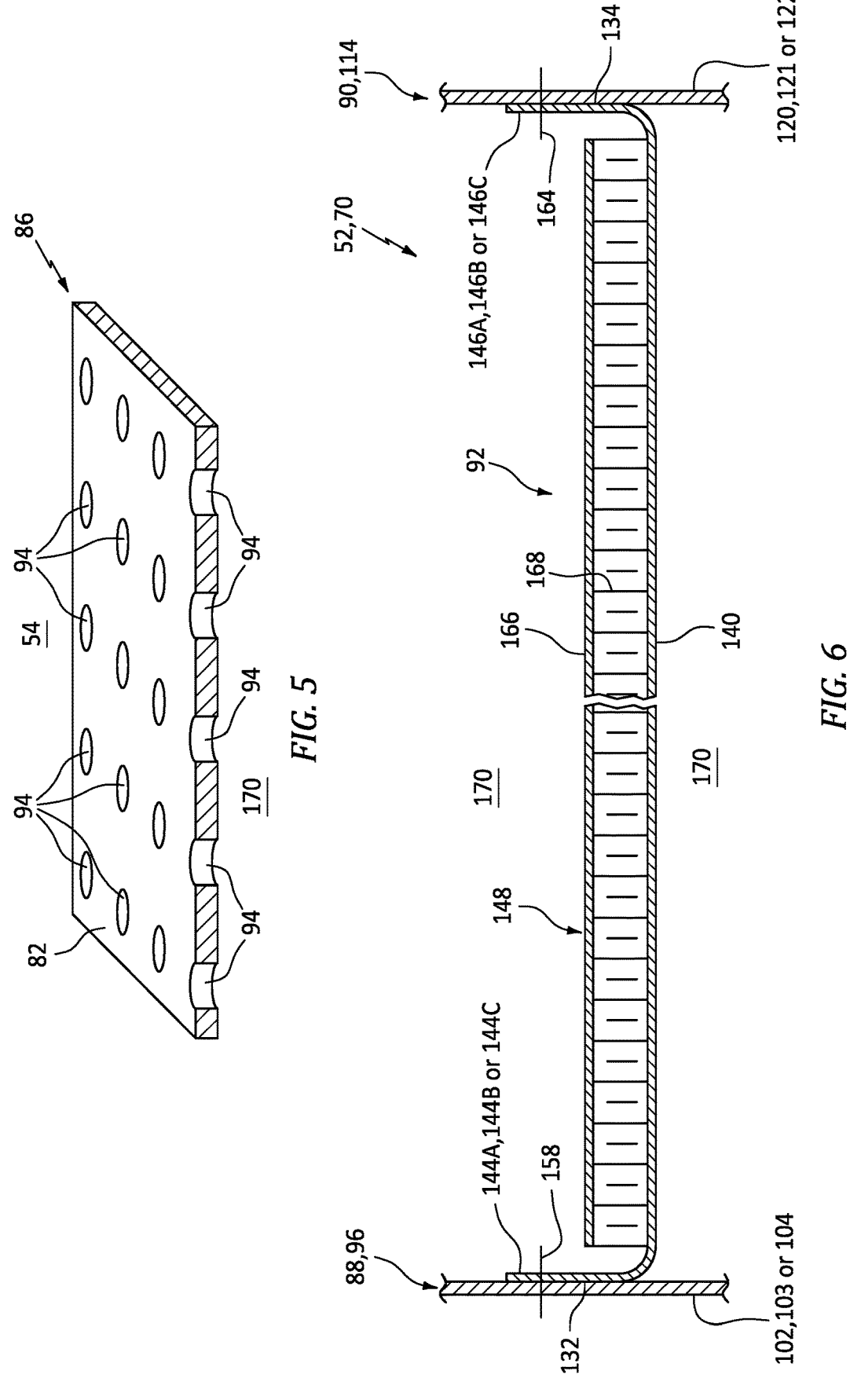
FIG. 5 is a perspective illustration of a portion of a perforated outer skin.
FIG. 6 is a partial sectional illustration of the center body section through a baffle.

Referring to FIG. 5, the perforations 94 are distributed axially along and/or circumferentially about the axial centerline 30 (see FIGS. 2-4). Each of the perforations 94 extends vertically (e.g., radially and/or in a direction perpendicular to the outer skin surfaces) through the outer skin 86 between the opposing outer skin surfaces.

Referring to FIG. 2, the forward bulkhead 88 includes a forward bulkhead panel 96. This forward bulkhead panel 96 may be configured as a relatively thin sheet or layer of continuous and uninterrupted material; e.g., non-perforated material. The forward bulkhead 88 and its forward bulkhead panel 96 extend radially between and to an inner end 98 of the forward bulkhead 88 and an outer end 100 of the forward bulkhead 88. Referring to FIG. 3, the forward bulkhead 88 and its forward bulkhead panel 96 extend circumferentially about (e.g., completely around) the axial centerline 30. The forward bulkhead 88 and its forward bulkhead panel 96 may thereby have a full-hoop annular geometry. The forward bulkhead panel 96 of FIG. 2 includes a forward panel inner portion 102, a forward panel outer portion 103 and a forward panel intermediate portion 104.

The forward panel inner portion 102 projects radially in from the forward panel intermediate portion 104 to the forward bulkhead inner end 98. The forward panel inner portion 102 and, thus, the forward bulkhead 88 and its forward bulkhead panel 96 are attached (e.g., mechanically fastened and/or bonded) to the inner skin 84 at the forward bulkhead inner end 98. This forward panel inner portion 102 may be arranged substantially perpendicular to the axial centerline 30 and/or the inner skin 84. The forward panel inner portion 102 of FIG. 2, for example, is angularly offset from the inner skin 84 by an angle 106 such as a right ninety degree (90°) angle. Of course, in other embodiments, the angle 106 may be slightly more or less (e.g., +/−5° or 10°) than ninety degrees.

The forward panel outer portion 103 projects radially out from the forward panel intermediate portion 104 to the forward bulkhead outer end 100. The forward panel outer portion 103 and, thus, the forward bulkhead 88 and its forward bulkhead panel 96 are attached (e.g., mechanically fastened and/or bonded) to the outer skin 86 at the forward bulkhead outer end 100. This forward panel outer portion 103 may be arranged substantially perpendicular to the axial centerline 30 and/or the outer skin 86. The forward panel outer portion 103 of FIG. 2, for example, is angularly offset from the outer skin 86 by an angle 108 such as a right ninety degree (90°) angle. Of course, in other embodiments, the angle 108 may be slightly more or less (e.g., +/−5° or 10°) than ninety degrees.

The forward panel intermediate portion 104 extends radially between and is connected to (e.g., formed integral with) the forward panel inner portion 102 and the forward panel outer portion 103. The forward panel intermediate portion 104 of FIG. 2 is angularly offset from each adjacent forward panel portion 102, 103 by an angle 110, 112. This angle 110, 112 may be an obtuse angle; e.g., between one-hundred and sixty degrees (160°) and one-hundred and seventy-five degrees (175°). While the angles 110 and 112 of FIG. 2 are equal, it is contemplated these angles 110 and 112 may be (e.g., slightly) different from one another.

The forward panel intermediate portion 104 has a radial height which may be different than (e.g., greater than) a radial height of the forward panel inner portion 102 and/or a radial height of the forward panel outer portion 103. The radial height of the forward panel intermediate portion 104 may account for between thirty percent (30%) and seventy percent (70%) or more of a radial height of the forward bulkhead 88 between the inner skin 84 and the outer skin 86. Of course, in other embodiments, it is contemplated the forward bulkhead panel 96 may be configured without the inner and outer portions 102 and 103 such that the forward bulkhead panel 96 extends (e.g., straight) between the inner skin 84 and the outer skin 86.

Referring to FIG. 2, the aft bulkhead 90 includes an aft bulkhead panel 114. This aft bulkhead panel 114 may be configured as a relatively thin sheet or layer of continuous and uninterrupted material; e.g., non-perforated material. The aft bulkhead 90 and its aft bulkhead panel 114 extend radially between and to an inner end 116 of the aft bulkhead 90 and an outer end 118 of the aft bulkhead 90. Referring to FIG. 4, the aft bulkhead 90 and its aft bulkhead panel 114 extend circumferentially about (e.g., completely around) the axial centerline 30. The aft bulkhead 90 and its aft bulkhead panel 114 may thereby have a full-hoop annular geometry. The aft bulkhead panel 114 of FIG. 2 includes an aft panel inner portion 120, an aft panel outer portion 121 and an aft panel intermediate portion 122.

The aft panel inner portion 120 projects radially in from the aft panel intermediate portion 122 to the aft bulkhead inner end 116. The aft panel inner portion 120 and, thus, the aft bulkhead 90 and its aft bulkhead panel 114 are attached (e.g., mechanically fastened and/or bonded) to the inner skin 84 at the aft bulkhead inner end 116. This aft panel inner portion 120 may be arranged substantially perpendicular to the axial centerline 30 and/or the inner skin 84. The aft panel inner portion 120 of FIG. 2, for example, is angularly offset from the inner skin 84 by an angle 124 such as a right ninety degree (90°) angle. Of course, in other embodiments, the angle 124 may be slightly more or less (e.g., +/−5° or 10°) than ninety degrees.

The aft panel outer portion 121 projects radially out from the aft panel intermediate portion 122 to the aft bulkhead outer end 118. The aft panel outer portion 121 and, thus, the aft bulkhead 90 and its aft bulkhead panel 114 are attached (e.g., mechanically fastened and/or bonded) to the outer skin 86 at the aft bulkhead outer end 118. This aft panel outer portion 121 may be arranged substantially perpendicular to the axial centerline 30 and/or the outer skin 86. The aft panel outer portion 121 of FIG. 2, for example, is angularly offset from the outer skin 86 by an angle 126 such as a right ninety degree (90°) angle. Of course, in other embodiments, the angle 126 may be slightly more or less (e.g., +/−5° or 10°) than ninety degrees.

The aft panel intermediate portion 122 extends radially between and is connected to (e.g., formed integral with) the aft panel inner portion 120 and the aft panel outer portion 121. The aft panel intermediate portion 122 of FIG. 2 is angularly offset from each adjacent aft panel portion 120, 121 by an angle 128, 130. This angle 128, 130 may be an obtuse angle; e.g., between one-hundred and sixty degrees (160°) and one-hundred and seventy-five degrees (175°). While the angles 128 and 130 of FIG. 2 are equal, it is contemplated these angles 128 and 130 may be (e.g., slightly) different from one another.

The aft panel intermediate portion 122 has a radial height which may be different than (e.g., greater than) a radial height of the aft panel inner portion 120 and/or a radial height of the aft panel outer portion 121. The radial height of the aft panel intermediate portion 122 may account for between thirty percent (30%) and seventy percent (70%) or more of a radial height of the aft bulkhead 90 between the inner skin 84 and the outer skin 86. Of course, in other embodiments, it is contemplated the aft bulkhead panel 114 may be configured without the inner and outer portions 120 and 121 such that the aft bulkhead panel 114 extends (e.g., straight) between the inner skin 84 and the outer skin 86.

Each baffle 92 of FIG. 2 (see also FIG. 6) extends axially along the axial centerline 30 between and to an upstream, forward end 132 of the respective baffle 92 and a downstream, aft end 134 of the respective baffle 92. Each baffle 92 of FIG. 2 (see also FIG. 7) extends radially between and to an inner side 136 of the respective baffle 92 and an outer side 138 of the respective baffle 92. Referring to FIG. 8, each baffle 92 includes a baffle panel 140 and one or more flanges 142, 144A-C (generally referred to as "144") and 146A-C (generally referred to as "146"); e.g., lips. Each baffle 92 may also include a structural panel 148 to structurally reinforce the respective baffle 92 and its baffle panel 140.

Figure 7:
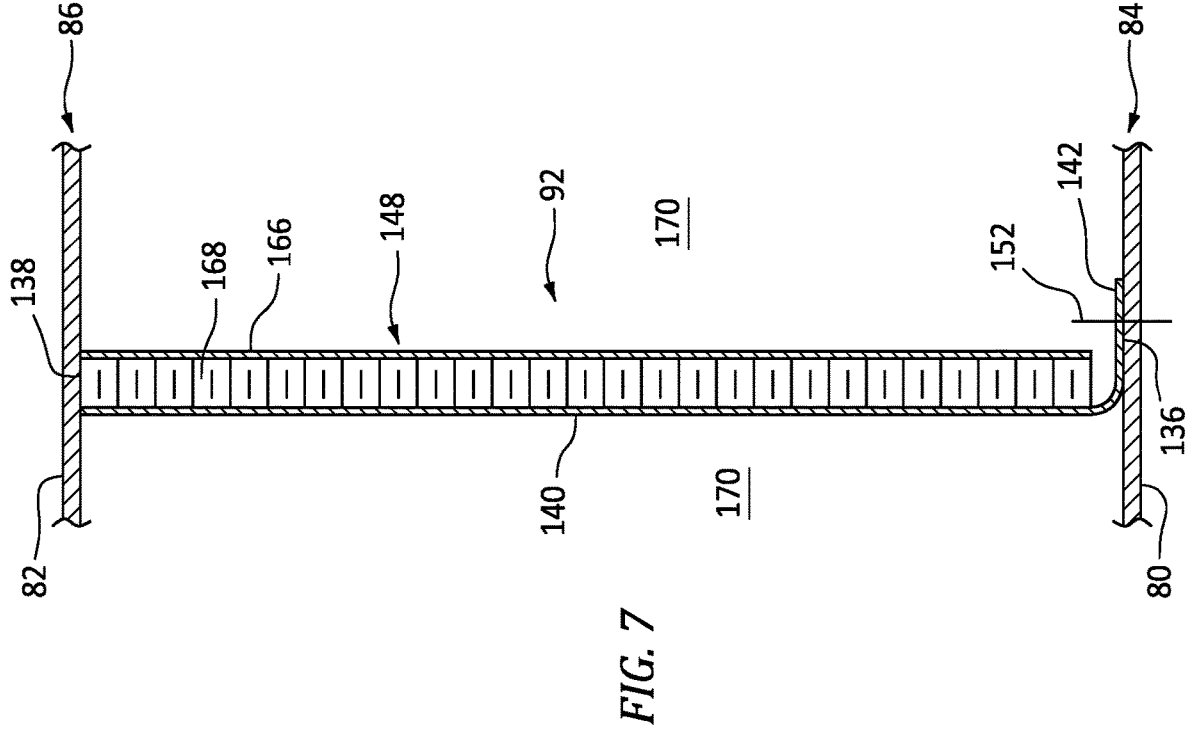
FIG. 7 is a partial cross-sectional illustration of the center body section through the baffle.
Figure 8:
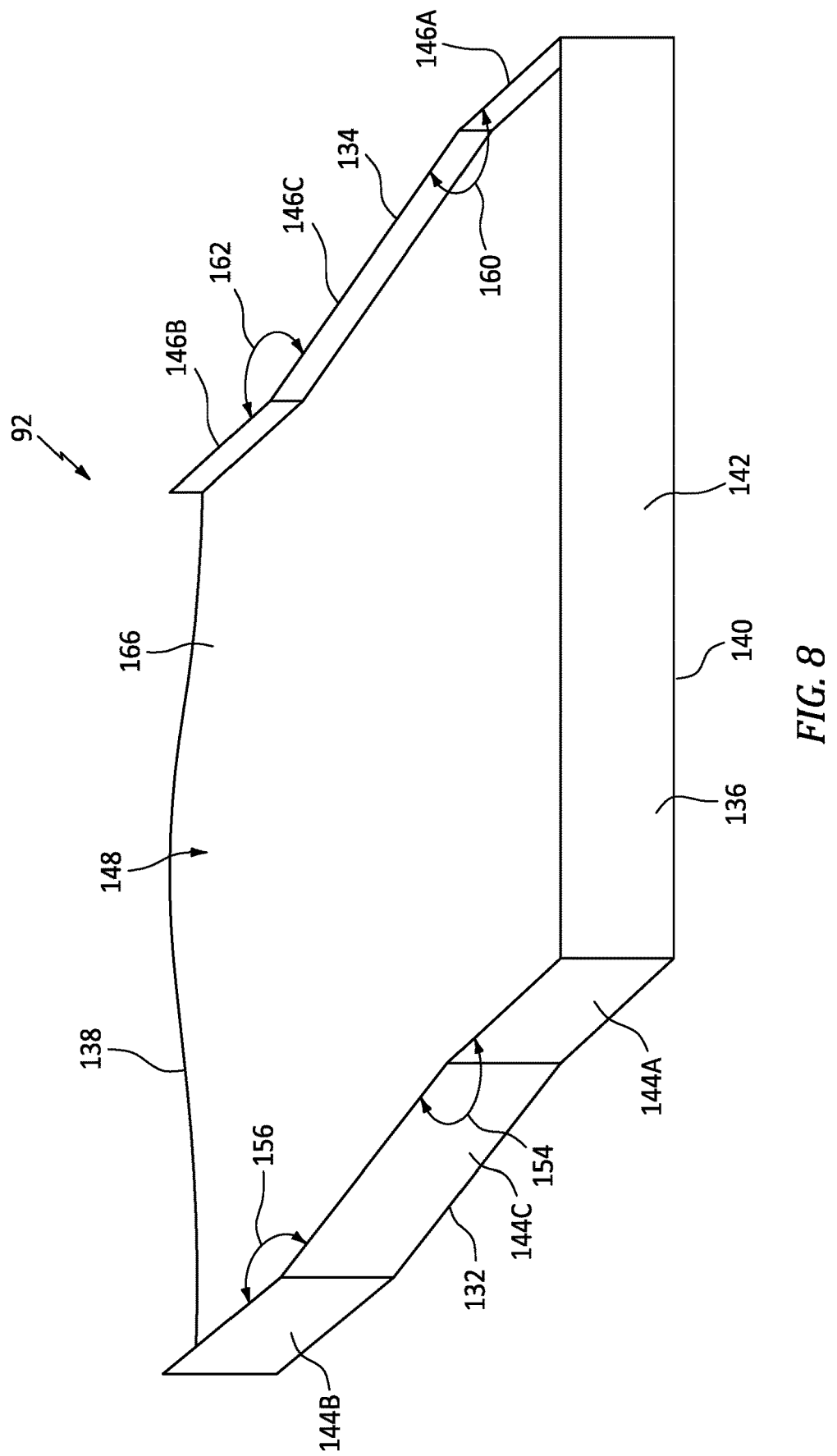
FIG. 8 is a perspective illustration of the baffle.
Figures 9A, 9B:
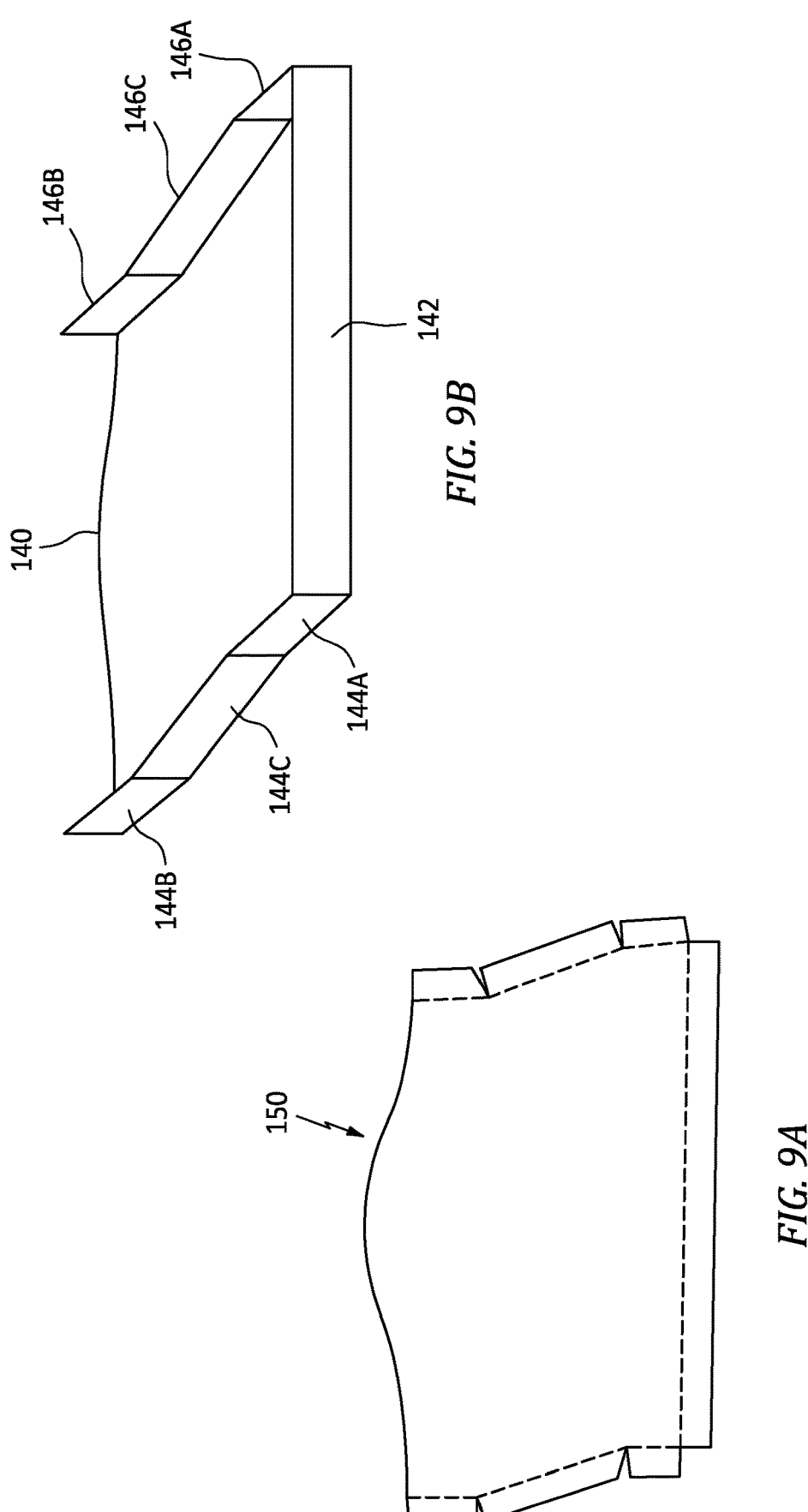
FIGS. 9A and 9B are illustrations depicting an exemplary sequence for forming a baffle panel with integral flanges.

Referring to FIGS. 6 and 7, the baffle panel 140 may be configured as a relatively thin sheet or layer of continuous and uninterrupted material; e.g., non-perforated material. The baffle panel 140 of FIG. 6 extends axially along the axial centerline 30 (see FIG. 2) between and to (or about) the baffle forward end 132 and the baffle aft end 134. The baffle panel 140 of FIG. 7 extends radially between and to (or about) the baffle inner side 136 and the baffle outer side 138. Referring to FIGS. 6 and 7, each of the flanges 142, 144, 146 projects laterally (e.g., generally circumferentially) out from the baffle panel 140 at a respective end/side of the baffle panel 140. Each of the flanges 142, 144, 146 may be formed integral with the baffle panel 140. A sheet of material 150 may be cut and brake formed as shown, for example, in FIGS. 9A and 9B to provide the baffle panel 140 and its integral flanges 142, 144 and 146.

Referring to FIG. 7, this inner skin flange 142 is attached to the inner skin 84 to mount the respective baffle 92 to the inner skin 84. The inner skin flange 142, for example, may be mechanically fastened to the inner skin 84 by one or more mechanical fasteners 152 (schematically shown); e.g., bolts, rivets, etc. Referring to FIG. 2, the inner skin flange 142 may extend axially along at least seventy percent (70%), eighty percent (80%), ninety percent (90%) or even one-hundred percent (100%) of an axial length of the baffle panel 140. The inner skin flange 142 may thereby structurally tie the respective baffle 92 to the inner skin 84 along a substantial or entire axial extent of the respective baffle 92 between the forward bulkhead 88 and the aft bulkhead 90.

Referring to FIG. 2, the forward bulkhead flanges 144 are arranged radially along baffle forward end 132. The outer forward bulkhead flange 144B is disposed radially outboard of the inner forward bulkhead flange 144A and the intermediate forward bulkhead flange 144C. The outer forward bulkhead flange 144B, for example, may be positioned adjacent to the baffle outer side 138. The inner forward bulkhead flange 144A is disposed radially inboard of the outer forward bulkhead flange 144B and the intermediate forward bulkhead flange 144C. The inner forward bulkhead flange 144A, for example, may be positioned adjacent to the baffle inner side 136. The intermediate forward bulkhead flange 144C is disposed radially between (and may be radially adjacent to) the outer forward bulkhead flange 144B and the inner forward bulkhead flange 144A. Referring to FIG. 8, the intermediate forward bulkhead flange 144C is angularly offset from each adjacent forward bulkhead flange 144A, 144B by an angle 154, 156. This angle 154, 156 may be an obtuse angle; e.g., between one-hundred and sixty degrees (160°) and one-hundred and seventy-five degrees (175°). While the angles 154 and 156 of FIG. 8 are equal, it is contemplated these angles 154 and 156 may be (e.g., slightly) different from one another.

Referring to FIG. 6, each forward bulkhead flange 144 is attached to the forward bulkhead panel 96 to mount the respective baffle 92 to the forward bulkhead 88. Each forward bulkhead flange 144, for example, may be mechanically fastened to the forward bulkhead panel 96 by one or more mechanical fasteners 158 (schematically shown); e.g., bolts, rivets, etc. More particularly, each forward bulkhead flange 144A, 144B, 144C may be mechanically fastened to a respective one of the forward panel portions 102, 103, 104. Referring to FIG. 2, each forward bulkhead flange 144A, 144B, 144C may extend radially along at least seventy percent (70%), eighty percent (80%), ninety percent (90%) or even one-hundred percent (100%) of a radial height of the respective forward panel portion 102, 103, 104. The forward bulkhead flanges 144 may thereby structurally tie the respective baffle 92 to the forward bulkhead 88 along a substantial or entire radial extent of the respective baffle 92 between the inner skin 84 and the outer skin 86.

The aft bulkhead flanges 146 are arranged radially along the baffle aft end 134. The outer aft bulkhead flange 146B is disposed radially outboard of the inner aft bulkhead flange

146A and the intermediate aft bulkhead flange 146C. The outer aft bulkhead flange 146B, for example, may be positioned adjacent the baffle outer side 138. The inner aft bulkhead flange 146A is disposed radially inboard of the outer aft bulkhead flange 146B and the intermediate aft bulkhead flange 146C. The inner aft bulkhead flange 146A, for example, may be positioned adjacent the baffle inner side 136. The intermediate aft bulkhead flange 146C is disposed radially between (and may be radially adjacent to) the outer aft bulkhead flange 146B and the inner aft bulkhead flange 146A. Referring to FIG. 8, the intermediate aft bulkhead flange 146C is angularly offset from each adjacent aft bulkhead flange 146A, 146B by an angle 160, 162. This angle 160, 162 may be an obtuse angle; e.g., between one-hundred and sixty degrees (160°) and one-hundred and seventy-five degrees (175°). While the angles 160 and 162 of FIG. 8 are equal, it is contemplated these angles 160 and 162 may be (e.g., slightly) different from one another.

Referring to FIG. 6, each aft bulkhead flange 146 is attached to the aft bulkhead panel 114 to mount the respective baffle 92 to the aft bulkhead 90. Each aft bulkhead flange 146, for example, may be mechanically fastened to the aft bulkhead panel 114 by one or more mechanical fasteners 164 (schematically shown); e.g., bolts, rivets, etc. More particularly, each aft bulkhead flange 146A, 146B, 146C may be mechanically fastened to a respective one of the aft panel portions 120, 121, 122. Referring to FIG. 2, each aft bulkhead flange 146A, 146B, 146C may extend radially along at least seventy percent (70%), eighty percent (80%), ninety percent (90%) or even one-hundred percent (100%) of a radial height of the respective aft panel portion 120, 121, 122. The aft bulkhead flanges 146 may thereby structurally tie the respective baffle 92 to the aft bulkhead 90 along a substantial or entire radial extent of the respective baffle 92 between the inner skin 84 and the outer skin 86.

The structural panel 148 of FIGS. 6-8 includes the baffle panel 140, a baffle skin 166 and a cellular core 168. The structural panel members 166 and 168 may have substantially the same geometry (e.g., shape, axial dimensions, radial dimensions, etc.) as the baffle panel 140. The cellular core 168 may be configured as a honeycomb core; however, the present disclosure is not limited to any particular cellular core configurations. The cellular core 168 of FIGS. 6 and 7 is arranged laterally (e.g., generally circumferentially) between the baffle panel 140 and the baffle skin 166. This cellular core 168 extends laterally between and is connected to (e.g., diffusion bonded, brazed, welded, etc.) the baffle panel 140 and the baffle skin 166. With this arrangement, the structural panel members 166 and 168 are configured to structurally reinforce the baffle panel 140 and, thus, the respective baffle 92. This may prevent or reduce likelihood of distortions to the baffle 92 such as, but not limited to, bending, flexing, buckling, etc.

Referring to FIGS. 3 and 4, the baffles 92 are distributed circumferentially about the axial centerline 30. The baffles 92 of FIGS. 3 and 4, for example, may be diametrically opposed. With this arrangement, the baffles 92 separate (e.g., fluidly decouple, acoustically divide, etc.) an annulus within the exhaust center body 52 and its center body section 70 into a plurality of acoustic chambers 170. Referring to FIG. 2, each of these acoustic chambers 170 extends axially within the center body section 70 along the inner skin 84 and the outer skin 86 (and the respective baffles 92) between and to the forward bulkhead 88 and the aft bulkhead 90. Referring to FIGS. 3 and 4, each of the acoustic chambers 170 extends radially within the center body section 70 along the forward bulkhead 88 and the aft bulkhead 90 (and the respective baffles 92) between and to the inner skin 84 and the outer skin 86. Each of the acoustic chambers 170 extends circumferentially within the center body section 70 along the center body members 84, 86, 88 and 90 between and to a respective neighboring (e.g., circumferentially adjacent) pair of the baffles 92. Each of the acoustic chambers 170 is fluidly coupled to the core flowpath 54 (e.g., an environment external to the exhaust center body 52) by the outer skin perforations 94 (see FIG. 5). Each of the acoustic chambers 170 may thereby attenuate sound (e.g., noise) propagating through the core flowpath 54 using known acoustic attenuation principals. The center body section 70 of FIGS. 2-4, in particular, may be configured as an acoustic deep cavity structure.

Figure 10:
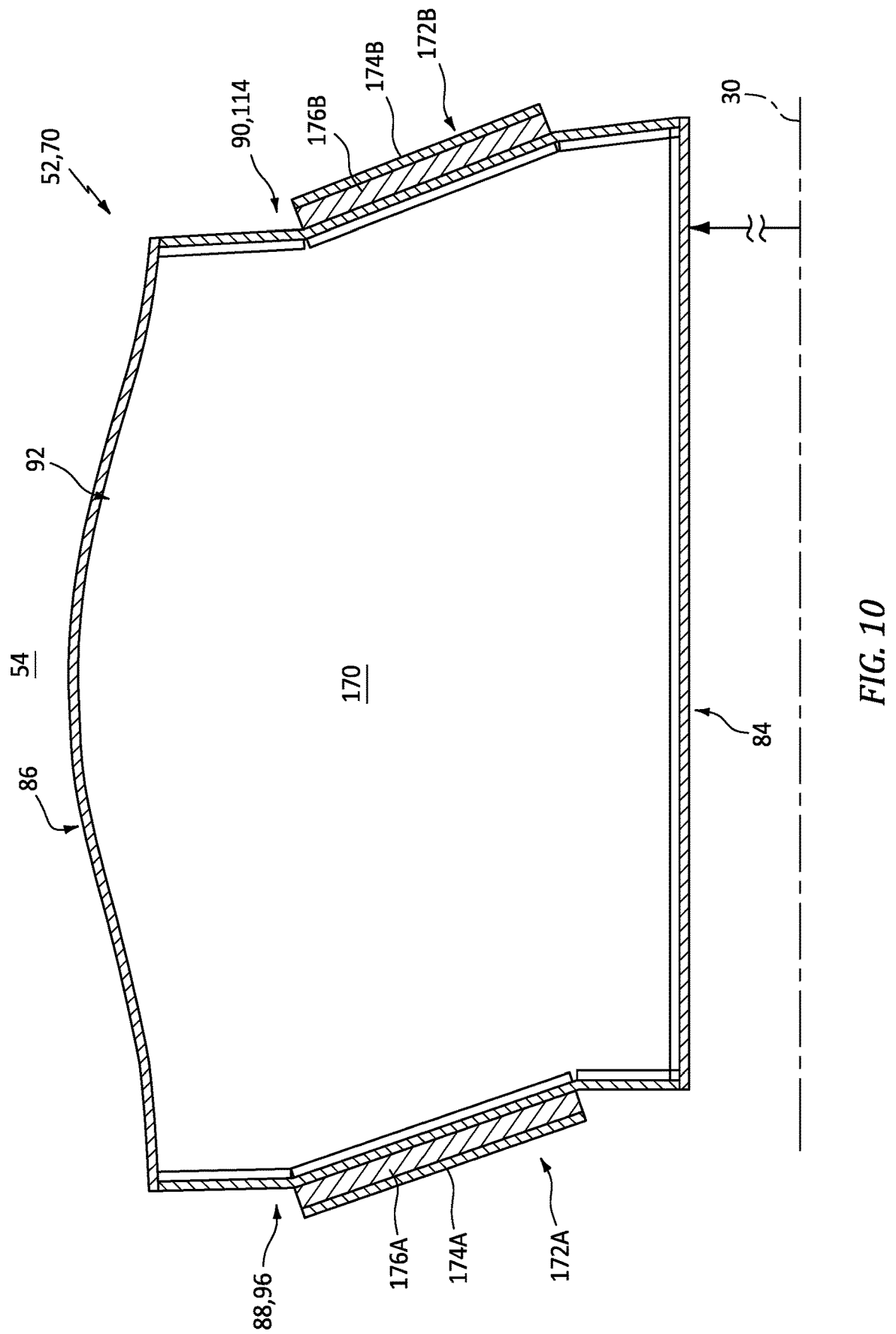
FIG. 10 is a partial side sectional illustration of the center body section configured with one or more bulkhead structural panels.
Figure 11:
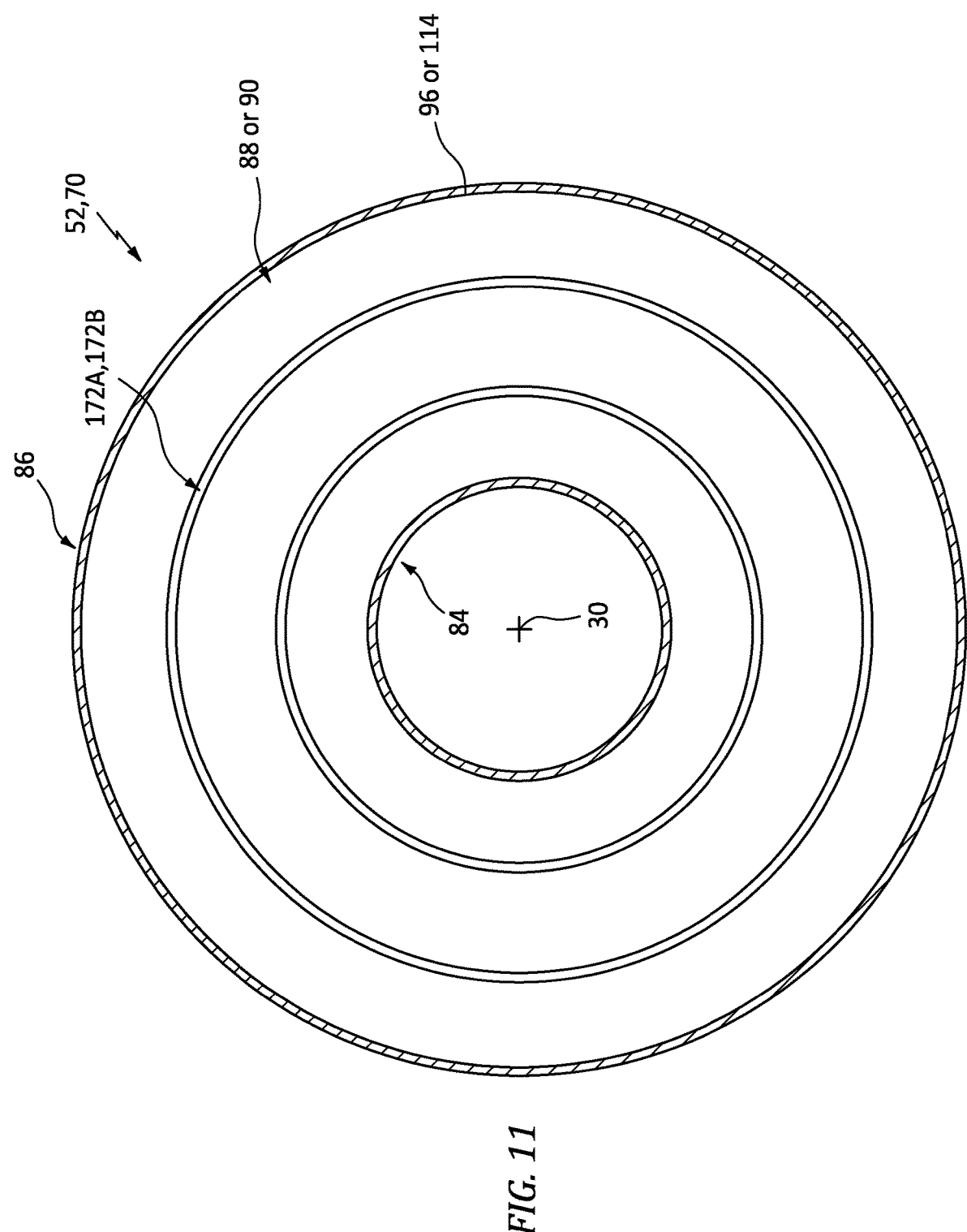
FIG. 11 is a cross-sectional illustration of the center body section configured with a bulkhead structural panel outside of an acoustic chamber.

In some embodiments, referring to FIGS. 10 and 11, one or both of the bulkheads 88, 90 may be configured with at least one (or multiple) structural panel 172A, 172B (generally referred to as "172") to structurally reinforce the respective bulkhead 88, 90 and its bulkhead panel 96, 114. Each structural panel 172A, 172B includes the bulkhead panel 96, 114, a bulkhead skin 174A, 174B (generally referred to as "174") and a cellular core 176A, 176B (generally referred to as "176"). The structural panel members 174A and 176A, 174B and 176B may have substantially the same geometry (e.g., shape, axial dimensions, radial dimensions, etc.) as the bulkhead panel 96, 114. The cellular core 176 may be configured as a honeycomb core; however, the present disclosure is not limited to any particular cellular core configurations. The cellular core 176A, 176B of FIG. 10 is arranged axially between the bulkhead panel 96, 114 and the bulkhead skin 174A, 174B. This cellular core 176A, 176B extends axially between and is connected to (e.g., diffusion bonded, brazed, welded, etc.) the bulkhead panel 96, 114 and the bulkhead skin 174A, 174B. With this arrangement, the structural panel members 174A and 176A, 174B and 176B are configured to structurally reinforce the bulkhead panel 96, 114 and, thus, the respective bulkhead 88, 90. This may prevent or reduce likelihood of distortions to the bulkhead 88, 90 such as, but not limited to, bending, flexing, buckling, etc.

Figure 12:
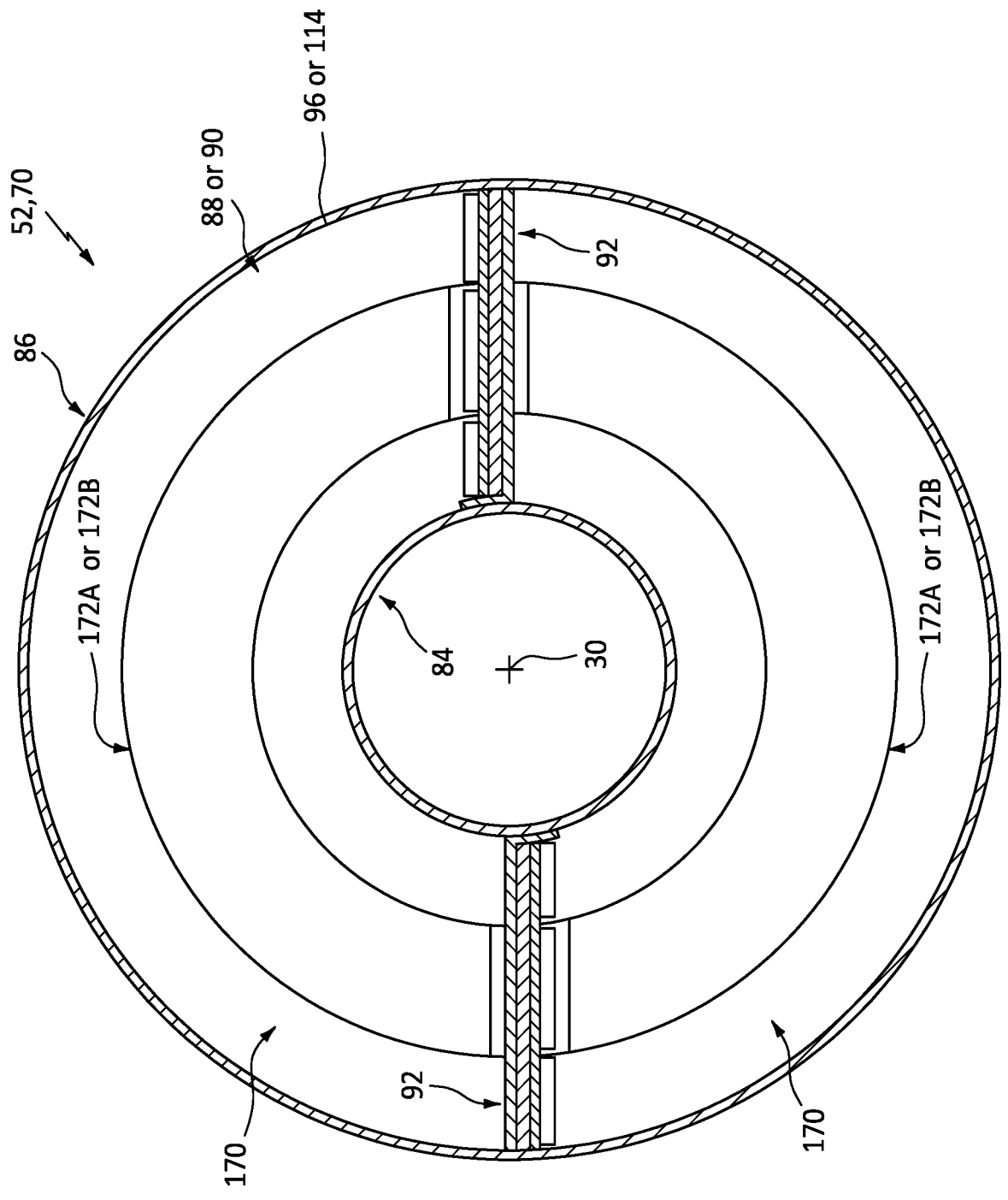
FIG. 12 is a cross-sectional illustration of the center body section configured with bulkhead structural panels within acoustic chambers.

In some embodiments, referring to FIGS. 10 and 11, each structural panel 176 may be arranged outside of the acoustic chambers 170. In other embodiments, referring to FIG. 12, one or more or all of the structural panels 176 may each be arranged inside of a respective one of the acoustic chambers 170.

Figure 13:
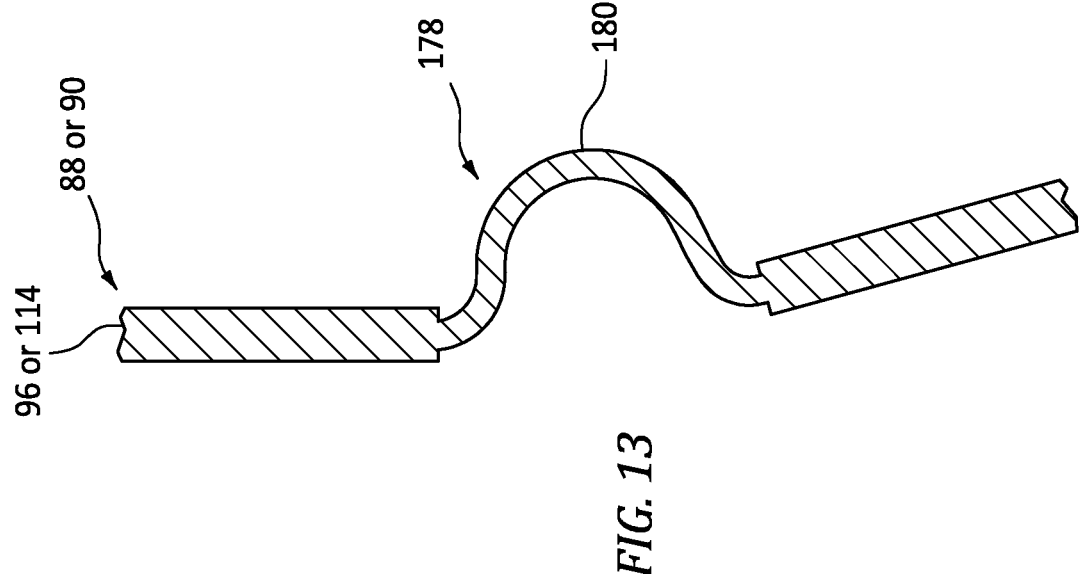
FIG. 13 is a partial sectional illustration of a bulkhead panel at a flex feature.

In some embodiments, referring to FIG. 13, the bulkhead 88, 90 may be configured with at least one flex feature 178 (or multiple flex features). The flex feature 178 of FIG. 13 is configured to accommodate (e.g., axial and/or radial) shifting between the inner skin 84 and the outer skin 86 of FIG. 2. Such shifting may be thermally induced. The exhaust center body 52 and its center body section 70, for example, may be subject to thermal gradients particularly where a temperature of the combustion products exhausted through the core flowpath 54 changes. The outer skin 86, in particular, may heat up much quicker than the inner skin 84 following, for example, engine startup or an increase of thrust. The outer skin material therefore may thermally expand at a faster rate than the cooler inner skin material resulting in shifting between the inner skin 84 and the outer skin 86.

The flex feature 178 of FIG. 13 may include a bead 180 rolled, pressed and/or otherwise formed into the bulkhead panel 96, 114. The bead 180 of FIG. 13 is located at an intersection between bulkhead panel portions. This bead 180 is configured as wrinkle (e.g., a C-channel, a U-channel, etc.) in the bulkhead panel 96, 114 and may function as a spring element between the respective bulkhead panel portions. The flex feature 178 may also or alternatively be formed by providing a portion of the bulkhead panel 96, 114 with a smaller thickness than radially adjacent portions of the bulkhead panel 96, 114. The material forming the bead 180, for example, may be chemically milled down in thickness. The flex feature 178 may extend circumferentially about (e.g., partially or completely around) the axial centerline 30.

The exhaust center body 52 may be configured for various gas turbine engines other than the one described above. The exhaust center body 52, for example, may be included in a geared gas turbine engine where a geartrain connects one or more shafts to one or more rotors in a fan section, a compressor section and/or any other engine section. Alternatively, the exhaust center body 52 may be included in a direct drive gas turbine engine configured without a geartrain. The exhaust nozzle may be included in a gas turbine engine configured with a single spool, with two spools (e.g., see FIG. 1), or with more than two spools. The gas turbine engine may be configured as a turbofan engine, a turbojet engine, a propfan engine, a pusher fan engine or any other type of gas turbine engine with an exhaust nozzle. Furthermore, the present disclosure is not limited to aircraft propulsion system applications. The gas turbine engine, for example, may alternatively be configured as an auxiliary power unit (APU) for the aircraft. The present disclosure therefore is not limited to any particular types or configurations of gas turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, comprising:

an exhaust center body including an inner skin, a perforated outer skin, a first bulkhead, a second bulkhead, a baffle and an acoustic chamber;

the first bulkhead extending radially between and attached to the inner skin and the perforated outer skin, and the first bulkhead extending circumferentially about an axial centerline;

the second bulkhead extending radially between and attached to the inner skin and the perforated outer skin, and the second bulkhead extending circumferentially about the axial centerline;

the baffle including a panel and a flange formed integral with the panel, the panel extending radially between the inner skin and the perforated outer skin, the panel extending axially along the axial centerline between the first bulkhead and the second bulkhead, and the panel attached to one of the inner skin, the first bulkhead or the second bulkhead by the flange; and the acoustic chamber formed within the exhaust center body radially between the inner skin and the perforated outer skin, axially between the first bulkhead and the second bulkhead, and circumferentially adjacent the baffle;

wherein the baffle further includes a baffle skin and a cellular core connected to and extending between the panel and the baffle skin.

2. The assembly of claim 1, wherein the flange is attached to the inner skin.

3. The assembly of claim 2, wherein the flange is attached to the inner skin with one or more mechanical fasteners.

4. The assembly of claim 2, wherein the flange extends along at least eighty percent of an axial length of the panel.

5. The assembly of claim 1, wherein the flange is attached to the first bulkhead.

6. The assembly of claim 5, wherein the flange is attached to the first bulkhead with one or more mechanical fasteners.

7. The assembly of claim 5, wherein the flange extends along at least forty percent of a radial height of the panel.

8. The assembly of claim 5, wherein
the flange is a first flange, and the baffle further includes a second flange formed integral with the panel; and
the second flange is attached to the first bulkhead and is radially adjacent the first flange.

9. The assembly of claim 5, wherein
the flange is a first bulkhead flange, and the baffle further includes a second bulkhead flange formed integral with the panel; and
the second bulkhead flange is attached to the second bulkhead.

10. The assembly of claim 9, wherein
the baffle further includes an inner skin flange formed integral with the panel; and
the inner skin flange is attached to the inner skin.

11. The assembly of claim 1, wherein the cellular core comprises a honeycomb core.

12. The assembly of claim 1, wherein
the first bulkhead comprises a first bulkhead structural panel; and
the first bulkhead structural panel includes a first bulkhead panel, a first bulkhead skin and a first bulkhead cellular core connected to and extending between the first bulkhead panel and the first bulkhead skin.

13. The assembly of claim 12, wherein
the second bulkhead comprises a second bulkhead structural panel; and
the second bulkhead structural panel includes a second bulkhead panel, a second bulkhead skin and a second bulkhead cellular core connected to and extending between the second bulkhead panel and the second bulkhead skin.

14. The assembly of claim 1, wherein the first bulkhead comprises a flex feature configured to accommodate shifting between the inner skin and the perforated outer skin.

15. The assembly of claim 14, wherein
the flex feature comprises a bead formed into a panel of the first bulkhead; and
the bead extends circumferentially about the axial centerline.

16. The assembly of claim 14, wherein the flex feature comprises a portion of a panel of the first bulkhead with a smaller thickness than a radially adjacent portion of the panel.

17. An assembly for a gas turbine engine, comprising:
an exhaust center body including an inner skin, a perforated outer skin, a first bulkhead, a second bulkhead, a baffle and an acoustic chamber;
the first bulkhead extending radially between and attached to the inner skin and the perforated outer skin, and the first bulkhead extending circumferentially about an axial centerline of the exhaust center body;
the second bulkhead extending radially between and attached to the inner skin and the perforated outer skin, and the second bulkhead extending circumferentially about the axial centerline of the exhaust center body;
the baffle extending radially between the inner skin and the perforated outer skin, the baffle extending axially along the axial centerline between the first bulkhead and the second bulkhead, the baffle attached to the inner skin, the first bulkhead and the second bulkhead, and the baffle comprising a structural panel with a honeycomb core; and
the acoustic chamber formed within the exhaust center body radially between the inner skin and the perforated outer skin, axially between the first bulkhead and the second bulkhead, and circumferentially adjacent the baffle.

18. The assembly of claim 17, wherein
the baffle includes a panel and a flange formed integral with the panel;
the panel extends radially and axially across the acoustic chamber; and
the flange is attached to one of the inner skin, the first bulkhead or the second bulkhead.

19. An assembly for a gas turbine engine, comprising:
an exhaust center body including an inner skin, a perforated outer skin, a first bulkhead, a second bulkhead, a baffle and an acoustic chamber;
the first bulkhead extending radially between and attached to the inner skin and the perforated outer skin, the first bulkhead extending circumferentially about an axial centerline of the exhaust center body, and the first bulkhead comprising a first structural panel with a first cellular core;
the second bulkhead extending radially between and attached to the inner skin and the perforated outer skin, the second bulkhead extending circumferentially about the axial centerline of the exhaust center body, and the second bulkhead comprising a second structural panel with a second cellular core;
the baffle extending radially and axially across the acoustic chamber, and the baffle attached to the inner skin, the first bulkhead and the second bulkhead; and
the acoustic chamber formed within the exhaust center body radially between the inner skin and the perforated outer skin, axially between the first bulkhead and the second bulkhead, and circumferentially adjacent the baffle.

* * * * *